United States Patent
Park (10) Patent No.: US 9,454,502 B2
(45) Date of Patent: Sep. 27, 2016

(54) PARALLEL COMMUNICATION DEVICE AND COMMUNICATION METHOD THEREOF

(75) Inventor: Tae Bum Park, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 532 days.

(21) Appl. No.: 13/491,477

(22) Filed: Jun. 7, 2012

(65) Prior Publication Data

US 2012/0317320 A1 Dec. 13, 2012

(30) Foreign Application Priority Data

Jun. 8, 2011 (KR) .................. 10-2011-0055340

(51) Int. Cl.
*G06F 13/00* (2006.01)
*G06F 13/40* (2006.01)

(52) U.S. Cl.
CPC .......... *G06F 13/4022* (2013.01); *G06F 13/00* (2013.01)

(58) Field of Classification Search
USPC ......... 710/110, 305, 315, 316, 317; 700/297
See application file for complete search history.

(56) References Cited

U.S. PATENT DOCUMENTS

| | | | |
|---|---|---|---|
| 4,794,520 A | 12/1988 | Kobus, Jr. et al. | |
| 4,866,667 A | 9/1989 | Shimada | |
| 5,107,489 A * | 4/1992 | Brown et al. | 370/360 |
| 5,619,722 A | 4/1997 | Lovrenich | |
| 6,222,848 B1 * | 4/2001 | Hayward et al. | 370/412 |
| 6,876,654 B1 * | 4/2005 | Hegde | 370/392 |
| 6,957,279 B2 * | 10/2005 | Odenwald et al. | 710/1 |
| 7,688,856 B2 * | 3/2010 | Jang et al. | 370/469 |
| 8,312,190 B2 * | 11/2012 | Wang et al. | 710/62 |
| 2002/0174251 A1 * | 11/2002 | Lasserre | 709/249 |
| 2005/0235084 A1 * | 10/2005 | Nariai | 710/110 |
| 2005/0238001 A1 * | 10/2005 | Hansen | 370/352 |
| 2007/0097948 A1 * | 5/2007 | Boyd et al. | 370/351 |
| 2007/0112984 A1 * | 5/2007 | Ohara | 710/107 |
| 2009/0074000 A1 * | 3/2009 | Bishop et al. | 370/419 |

(Continued)

FOREIGN PATENT DOCUMENTS

| | | |
|---|---|---|
| CN | 1972303 | 5/2007 |
| JP | 60-005646 | 1/1985 |

(Continued)

OTHER PUBLICATIONS

Japan Patent Office Application Serial No. 2012-130472, Office Action dated Aug. 13, 2013, 3 pages.

(Continued)

*Primary Examiner* — Khanh Dang (74) *Attorney, Agent, or Firm* — Lee, Hong, Degerman, Kang & Waimey PC; Jonathan Kang; Justin Lee (57) ABSTRACT

Provided are a parallel communication device and a communication method thereof. The parallel communication device includes: a first receiving terminal receiving communication data transmitted through a master device; a first transmitting terminal transmitting the communication data received through the first receiving terminal to a slave device; a switch managing a communication line disposed between the first transmitting terminal and a plurality of slave devise; and a control unit confirming a first slave device to which the communication data are to be transmitted by using destination information in the communication data, and transmitting the received communication data to the confirmed first slave device.

11 Claims, 5 Drawing Sheets

(56) References Cited

U.S. PATENT DOCUMENTS

2009/0164694 A1* 6/2009 Talayco et al. ............... 710/316
2011/0289248 A1* 11/2011 Djabbari et al. .............. 710/110
2012/0253541 A1* 10/2012 Arditi et al. .................. 700/298

FOREIGN PATENT DOCUMENTS

| JP | 2002041377 | 2/2002 |
| JP | 2003188810 | 7/2003 |
| JP | 2010-109611 | 5/2010 |

OTHER PUBLICATIONS

Durwin D. Nigus et al., "An Easy-To-Use, Host-Independent Data Acquisition System", IEEE Instrumentation and Technology Conference, Apr. 1989, 7 pages, XP000041340.
European Patent Office Application Serial No. 12170970.3, Search Report dated Nov. 30, 2012, 8 pages.
The State Intellectual Property Office of the People's Republic of China Application Serial No. 201210189628.1 Office Action dated Nov. 4, 2014, 8 pages.

* cited by examiner

PARALLEL COMMUNICATION DEVICE AND COMMUNICATION METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2011-0055340, filed on Jun. 8, 2011, the contents of which are hereby incorporated by reference herein in their entirety.

BACKGROUND

The present disclosure relates to a parallel communication device, and more particularly, to a parallel communication device applied to a solar inverter and a communication method thereof.

A solar power generation system includes a solar module and a solar inverter. Additionally, in the case of a large-scaled solar power generation system, a plurality of solar modules and a plurality of solar inverters are connected to generate power.

At this point, the solar inverter is a power generating device that delivers power to a commercial system by using DC energy generated from a solar module.

However, the capacity of a solar inverter is limited, and accordingly, in order to establish a large capacity of a power generation facility, a system is required, in which a plurality of solar inverters are connected in parallel to provide large output.

When a solar power generating system is configured with such a plurality of solar inverters connected in parallel, the solar inverters need to communicate with each other. A communication method thereof becomes a very important factor in the system configuration.

Figure 1:
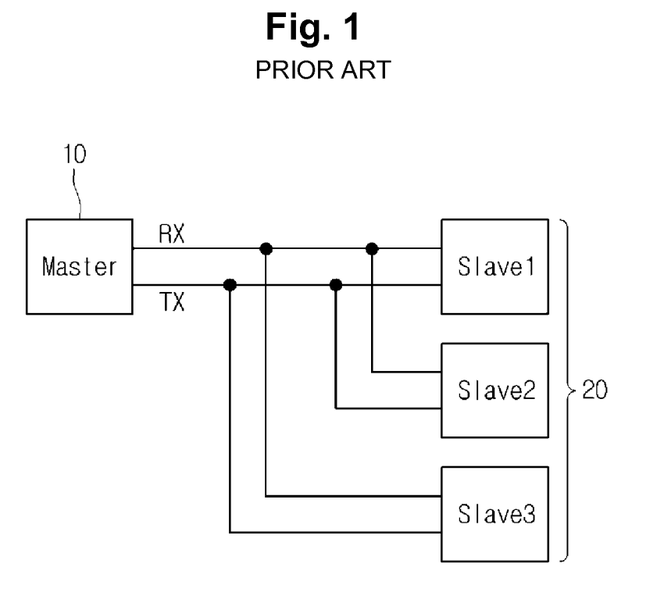
FIG. 1 is a view illustrating a configuration of a related art solar inverter communication device.

FIG. 1 is a view illustrating a configuration of a related art solar inverter communication device.

Referring to FIG. 1, the solar inverter communication device includes a master device 10, and at least one slave device 20 connected to the master device 10 through a communication transmission line. FIG. 1 illustrates an example of a parallel communication device in which one master device 10 is connected to three slave devices 20.

In the above parallel communication configuration, a prefix number needs to be assigned to each slave device 20 in order for the master device 10 to communicate with each slave device separately. The prefix number is an identification number to distinguish each slave device 10.

In relation to an operation of the solar inverter communication device, when the master device 10 transmits communication data, all the salve devices 20 connected to a communication network receives the transmitted communication data.

At this point, the transmitted communication data needs to be applied to only a specific slave device that the master device 10 specifies.

Accordingly, the master device 10 inserts prefix information corresponding to a final destination (i.e., a slave device to which the communication data are to be applied) of the communication data into the communication data.

Therefore, each slave device 20 responds to a communication with the master device 10 only when the prefix information in the received communication data corresponds to its own prefix information.

That is, the communication data transmitted through the master device 10 are received by all the salve devices 20, but only the salve device 20 corresponding to the prefix information in the communication data responds to the transmitted communication data. Therefore, parallel communication is possible.

As mentioned above, when communication is performed with a plurality of slave devices 20 connected in parallel, a prefix number is assigned to each solar inverter for mutual distinction, so that data conflicts or communication errors between slave devices, which occur during communication, may be prevented.

However, in order to use a parallel communication through a related art communication method, since a prefix number is assigned to each slave device 20, it needs to be reflected in a communication protocol. Moreover, if there is no function to assign a prefix number to each slave device 20, it is impossible to configure the above parallel communication system.

Furthermore, when a manufacturer attempts to connect different salve devices in parallel but each salve device has different communication protocols, it is impossible to configure a parallel communication. Therefore, when the parallel communication is configured, only slave devices having the same communication protocol need to be selected.

SUMMARY

Embodiments provide a parallel communication by connecting a master device and a plurality of slave devices having no prefix number assigning function via a communication network.

Embodiments also provide a parallel communication by connecting a master device and a plurality of slave devices using different communication protocols via a communication network.

In one embodiment, a parallel communication device includes: a first receiving terminal receiving communication data transmitted through a master device; a first transmitting terminal transmitting the communication data received through the first receiving terminal to a slave device; a switch managing a communication line disposed between the first transmitting terminal and a plurality of slave devise; and a control unit confirming a first slave device to which the communication data are to be transmitted by using destination information in the communication data, and transmitting the received communication data to the confirmed first slave device.

In another embodiment, a communication method includes: receiving communication data transmitted through a master device; confirming a first slave device to which the communication data are to be transmitted among a plurality of slave devices by confirming destination information in the communication data; activating a communication line connected to the first slave device when the first slave device is confirmed; and transmitting the received communication data to the first slave device through the activated communication line.

The details of one or more embodiments are set forth in the accompanying drawings and the description below. Other features will be apparent from the description and drawings, and from the claims.

DETAILED DESCRIPTION OF THE EMBODIMENTS

Various modifications may be applied to embodiments, and thus, different embodiments may be obtained. Herein, specific embodiments will be described with reference to the accompanying drawings.

However, the embodiments therein will not limit the present invention to specific embodiments, and should be understood as including all modifications, equivalents, and substitutions within the idea and technical scope of the present invention.

Also, though terms like a first and a second are used to describe various components, the components are not limited to these terms. The terms are only used to distinguish one component from another component. For example, without being departed from the scope of the present invention, a first component may be referred to as a second component, and similarly, a second component may be referred to as a first component. Terms like and/or includes a combination of a plurality of related items or one of a plurality of related items.

Additionally, if not defined differently, all terms used in this specification, including technical or scientific terms, have the same meanings, which are generally understood by those skilled in the art. Terms defined by generally-used dictionaries should be understood as having the same meaning as those in the contexts of related techniques. If not clearly defined in this specification, they are not interpreted as abnormal or excessively formal meaning.

Hereinafter, the present invention will be described in detail by explaining preferred embodiments of the invention with reference to the attached drawings. In describing the present invention, in order to make overall understanding easy, like reference numerals refer to like elements, and overlapping descriptions on the same components will be omitted.

Figure 2:
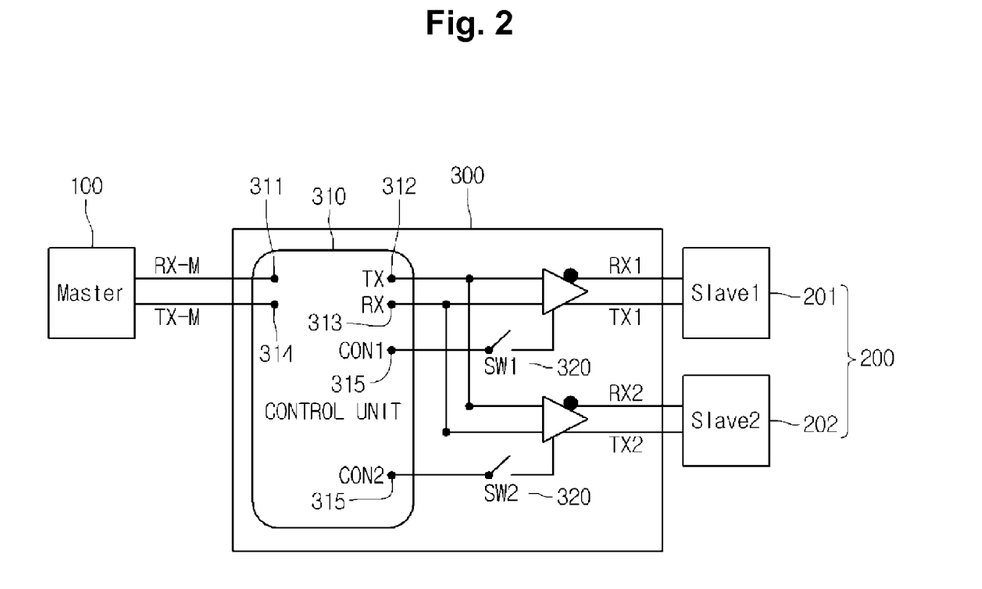
FIG. 2 is a diagram of a communication system according to a first embodiment.
Figure 3:
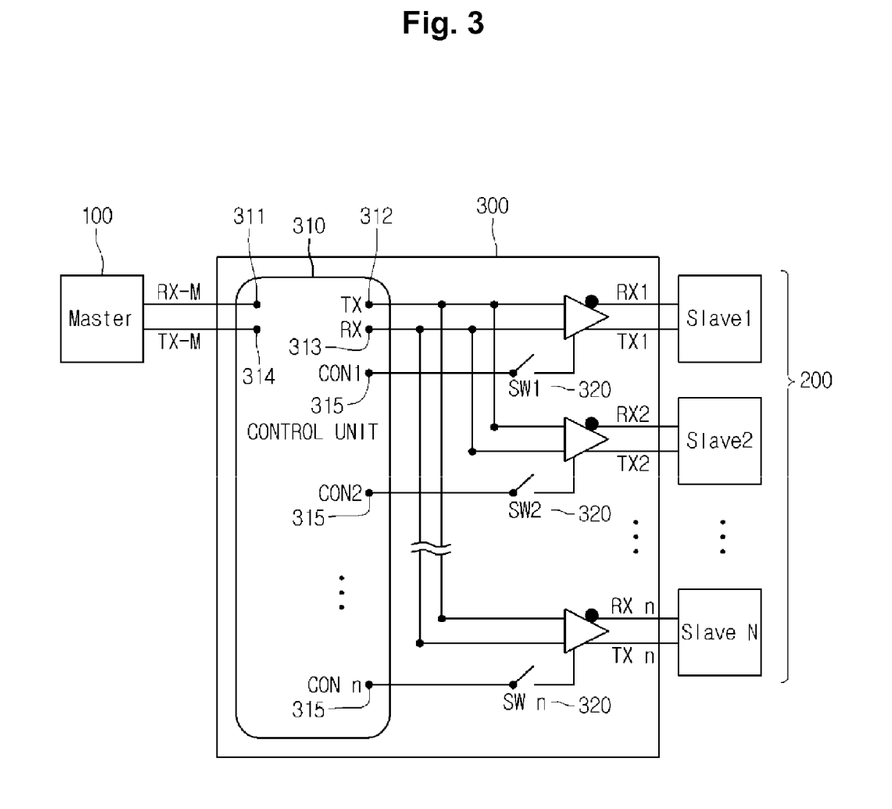
FIG. 3 is a diagram of a communication system according to a second embodiment.

FIG. 2 is a diagram of a communication system according to a first embodiment. FIG. 3 is a diagram of a communication system according to a second embodiment.

FIG. 2 is a diagram of a communication system when two slave devices 200 are connected in parallel. FIG. 3 is a diagram of a communication system when N slave devices 200 are connected in parallel.

That is, the number of slave devices 200 connected in parallel in a communication system is not an important factor. As the number of slave devices 200 is increased, only communication lines corresponding to the number of increased slave devices and switches for managing the increased communication lines are selectively increased.

Referring to FIG. 2, the communication system includes a master device 100, a plurality of slave devices 200, and a parallel communication device 300.

The plurality of slave devices 200 include a first slave device 201 and a second slave device 202.

Additionally, the parallel communication device 300 receives communication data transmitted through the master device 100, and transmits the received communication data to one of the plurality of slave devices 200.

Additionally, the parallel communication device 300 receives response data transmitted through the slave device 200, and transmits the received response data to the master device 100.

Hereinafter, the above communication system will be described in more detail.

The master device 100 monitors an operation status of the plurality of slave devices 200, and controls them according to the monitoring result.

The slave device 200 may be an inverter for solar power generation. The inverter for solar power generation includes an inverse conversion unit, a filter unit, a commercial frequency transformer, and an inverter output unit.

An operation of the inverter for solar power generation will be briefly described.

Once DC power is inputted from a DC power input unit of a solar cell array, the inverse conversion unit converts the DC power into AC power. Additionally, the inverse conversion unit calculates a phase and frequency of a system, and accordingly, outputs the converted AC power in synchronization with the system.

The AC power outputted from the inverse conversion unit is converted into a sine wave AC power through the filter unit, and then, is delivered to the commercial frequency transformer. The commercial frequency transformer is electrically insulated from the system. After stepping up or stepping down the delivered sine wave AC power, the commercial frequency transformer outputs it to the system through the output unit.

A plurality of the above inverters for solar power generation are connected in parallel in order to provide a large capacity of a power generation facility, so that a solar power generation system is configured.

The parallel communication device 300 includes a control unit 310 controlling the transmission of communication data or response data, and a plurality of switches 320 managing a communication line connected to each slave device 200 in response to a control signal inputted from the control unit 310.

At this point, as shown in FIG. 2, if there are two slave devices, the plurality of switches 320 include a first switch managing a communication line connected to the first slave device 201 and a second switch managing a communication line connected to the second slave device 202.

Additionally, as shown in FIG. 3, if there are N slave devices 200, N switches having the same number as the slave devices 200 are provided.

The control unit 310 includes a first receiving terminal 311 receiving communication data transmitted from the master device 100, a first transmitting terminal 312 transmitting the communication data received through the first receiving terminal 311 to the slave device 200, a second receiving terminal 313 receiving response data transmitted from the slave device 200, and a second transmitting terminal 314 transmitting the response data received through the second receiving terminal 313 to the master device 100.

That is, the control unit 310 includes a receiving terminal receiving communication data transmitted through the master device 100 and a transmitting terminal transmitting the received communication data to a slave device.

Additionally, the control unit 310 includes a receiving terminal receiving response data transmitted through a slave device and a transmitting terminal transmitting the received response data to the master device.

Accordingly, the control unit 310 includes a plurality of receiving terminals and a plurality of transmitting terminals.

Hereinafter, referring to FIGS. 4 and 5, an operation of the above configured communication system will be described in more detail. At this point, for convenience of description, operations of the communication system shown in FIGS. 4 and 5 will be described in linkage with the components shown in FIG. 2.

Figure 4:
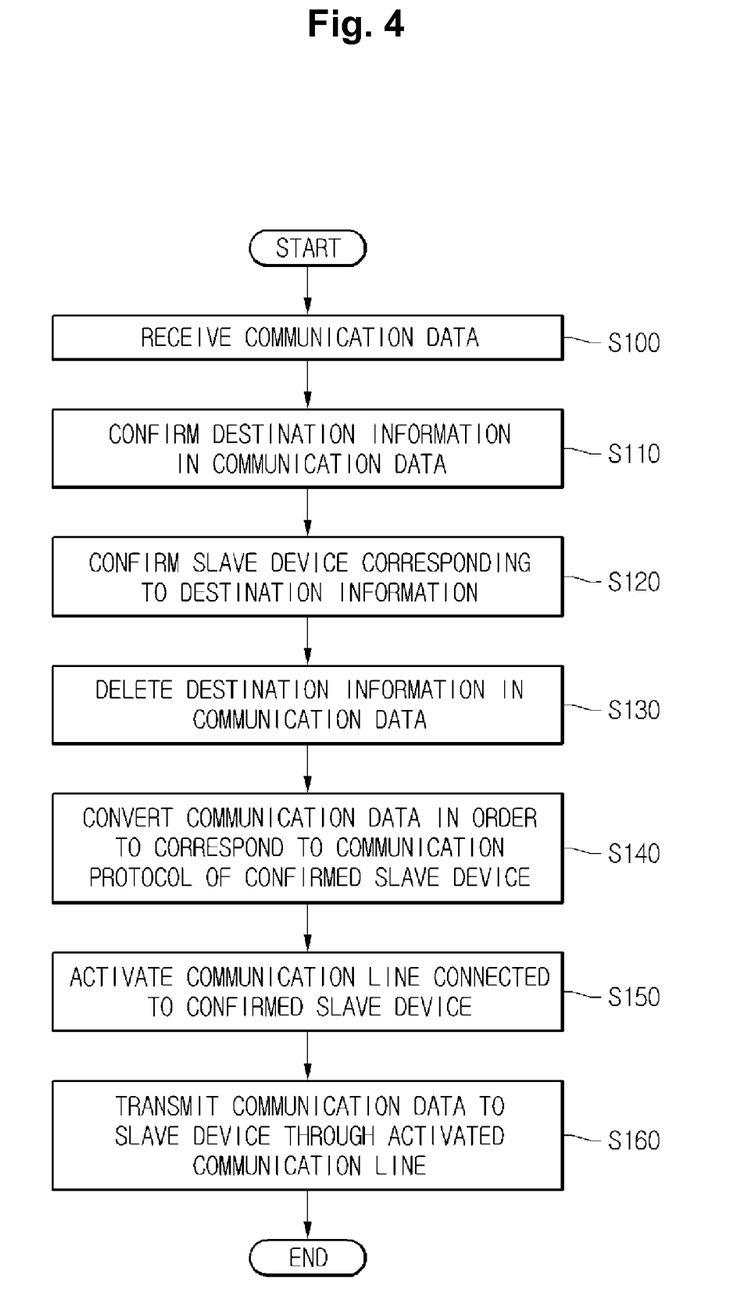
FIG. 4 is a flowchart illustrating a method of transmitting communication data according to an embodiment.

FIG. 4 is a flowchart illustrating a method of transmitting communication data according to an embodiment. FIG. 5 is a flowchart illustrating a method of transmitting response data according to an embodiment.

At this point, in the description of an embodiment, communication data and response data are used. The communication data are data transmitted from the master device 100 to the salve device 200. The response data are data transmitted from the slave device 200 to the master device 100 in response to the communication data.

First, referring to FIG. 4, the control unit 310 receives communication data transmitted from the master device 100 through the first receiving terminal 311 in operation S100.

The communication data are data that are to be transmitted from the master device 100 to a specific slave device 200. The communication data may include operating status information that is to be reflected in the specific slave device 200.

On receiving the communication data, the control unit 310 confirms destination information in the received communication data in operation S110, and confirms a slave device to which the communication data are to be transmitted by using the confirmed destination information in operation S120.

That is, the communication data includes destination information. That is, if there is communication data that are to be transmitted to a specific slave device, the master device 100 inserts destination information corresponding to the specific slave device into the communication data, and transmits the communication data having the destination information inserted to the parallel communication device 200.

Accordingly, the control unit 310 interprets the destination information in the communication data in order to confirm a salve device to which the communication data are to be delivered.

At this point, the destination information may be prefix number information assigned to distinguish each of the plurality of connected slave devices 200. At this point, a prefix number is not assigned to each of the slave devices 200. That is, the prefix information is identification information that is virtually assigned as a protocol between the master device 100 and the communication device 300 in order to distinguish the plurality of salve devices 200.

For example, according to a protocol between the master device 100 and the communication device 300, the first slave device 201 may be virtually assigned with prefix information '1', the second slave device 202 may be virtually assigned with prefix information '2', and a slave device N may be virtually assigned with prefix information 'N'.

Accordingly, if there are data to be communicated with a specific slave device, the master device 100 generates communication data that is to be transmitted to a slave device, and inserts prefix information, which is virtually assigned to the slave device, into the generated communication data. At this point, the inserted prefix information may be destination information corresponding to the slave device to which the communication data are to be transmitted.

If the destination information in the communication data is confirmed, the control unit 310 confirms the slave device corresponding to the destination place of the received communication data. For example, if the destination information is '1', it is confirmed that the final destination of the communication data is the first slave device 201.

If the slave device 201 corresponding to the final destination of the communication data is confirmed, the control unit 310 deletes the destination information in the communication data in operation S130.

That is, the destination information is information only effective between the master device 100 and the communication device 300. In other words, the destination information cannot be interpreted by each slave device 200, and can be interpreted only by the master device 100 and the communication device 300.

However, if the destination information is included in the communication data and then is transmitted to the specific slave device 200, it is possible for the slave device 200 to misinterpret the communication data due to the destination information therein. That is, if the communication data including the destination information is transmitted to a slave device, data communication errors may occur due to the destination information.

Accordingly, if the slave device corresponding to the final destination of the communication data is confirmed, the destination information in the communication data is deleted.

Once the destination information in the communication data is deleted, the control unit 310 compares the format of the communication data with that used in the slave device to which the communication data are to be transmitted, and then converts the format of the communication data on the basis of the comparison result in operation S140.

That is, according to an embodiment, a plurality of slave devices manufactured in different manufactures may be connected in parallel, and data communication may be performed using different communication protocols in the plurality of slave devices connected in parallel.

Accordingly, the control unit 310 stores information on a communication protocol used in each of the plurality of slave devices 200 connected in parallel. Additionally, the control unit 310 converts the format of the communication data in order to correspond to the communication protocol later by using the stored information.

Accordingly, the master device 100 generates the communication data in order to correspond to a promised common standard format, and then transmits it to the communication device 300.

Then, once the communication data are received, the control unit 310 confirms a communication protocol of a slave device to which the communication data are to be transmitted. Moreover, the control unit 310 determines whether the communication protocol of the confirmed slave device is identical to that of the communication data. At this point, the communication protocol of the communication data is one used in the master device 100.

If the two communication protocols are identical, the control unit 310 does not perform the conversion process, and transmits the communication data having the destination information deleted to the slave device as it is. However, if the two communication protocols are different, the control unit 310 converts the format of the received communication data in order to correspond to the communication protocol used in the slave device.

Next, the control unit 310 activates a communication line connected to the confirmed slave device in operation S150.

For this, once a slave device to which the communication data are to be transmitted is confirmed, the control unit 310 confirms a switch that manages a communication line connected to the slave device. For example, if the final destination of the communication data is determined as the first slave device 201, a switch 1 SW1 may be confirmed as a switch that manages a communication line connected to the first slave device 201.

Once the switch is confirmed, the control unit 310 outputs a control signal in order to activate the communication line connected to the confirmed slave device through a control line connected to the switch.

At this point, before the communication data are received, all switches managing each communication line maintain an off status. In other words, all communication lines maintain an inactive status.

Then, once the communication data are received, the control unit 310 turns on only the confirmed switch in order to activate only the communication line connected to the slave device to which the communication data are to be transmitted.

Accordingly, the control unit 310 transmits the communication data to the activated communication line through the first transmitting terminal 312 in operation S160.

Figure 5:
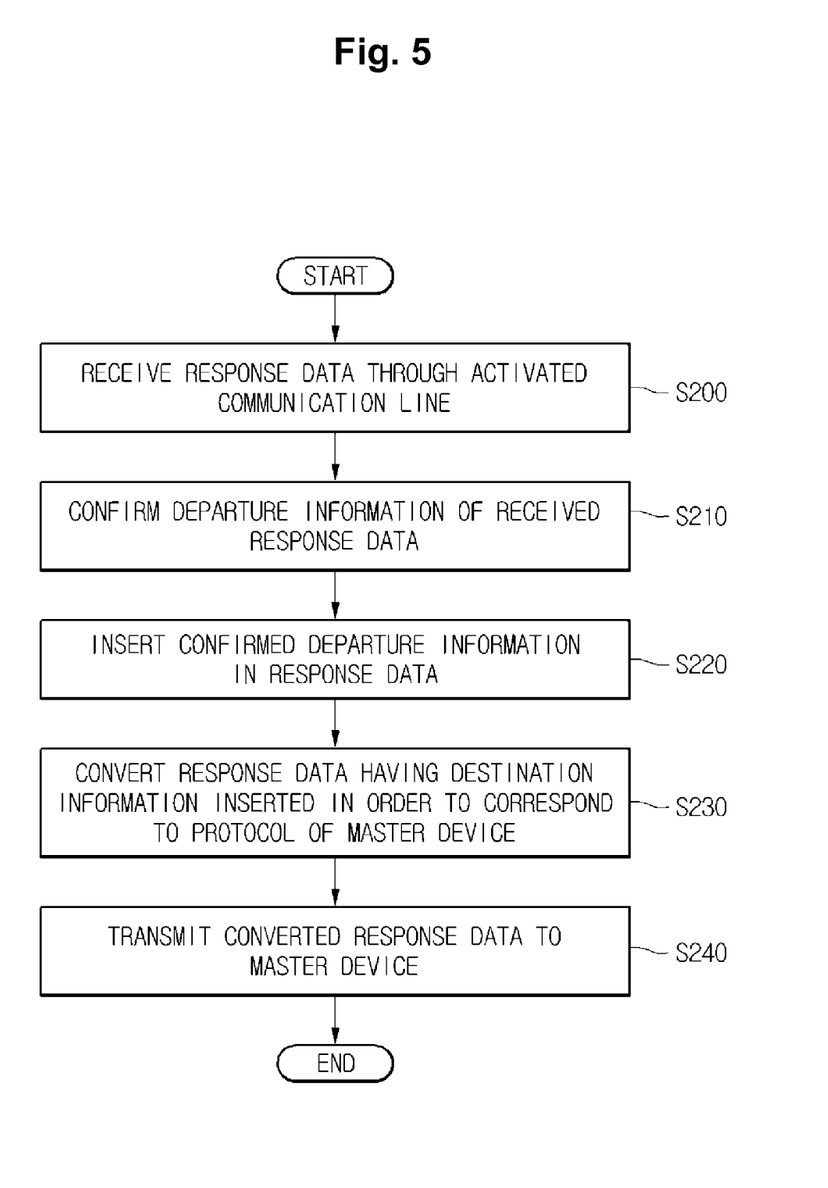
FIG. 5 is a flowchart illustrating a method of transmitting response data according to an embodiment.

Then, referring to FIG. 5, the control unit 310 receives response data transmitted from the currently-activated communication line through the second receiving terminal 313 in operation S200.

At this point, the activated communication line is a line that is activated for transmitting the communication data. That is, the activated communication line is a line connected to a slave device corresponding to the final destination of the communication data.

Moreover, the response data are data that a slave device receiving the communication data transmits to the master device in response to the transmitted communication data. That is, the response data are a processed result signal as an operation is performed according to the communication data.

Once the response data are received, the control unit 310 confirms departure information in the received response data in operation S210.

That is, the control unit 310 confirms the prefix number virtually assigned to the slave device that transmits the response data.

Once the departure information is confirmed, the control unit 310 inserts the confirmed departure information into the received response data in operation S220.

Once the destination information is inserted into the response data, the control unit 310 compares the communication protocol used in a slave device that transmits the response data with that used in the master device, i.e., confirms whether the two communication protocols are identical or different.

If the two communication protocols are identical, the control unit 310 transmits the response data having the departure information inserted to the master device 100 as it is. However, if the two communication protocols are different, the control unit 310 converts the format of the response data in order to correspond to the communication protocol used in the master device 100 in operation S230.

Once the format of the response data is converted, the control unit 310 transmits the converted response data to the master device 100 through the second transmitting terminal 134 in operation S240.

According to this embodiment, a master device and a plurality of slave devices having no prefix assigning function are connected via a communication network in order for parallel communication. Also, even if a plurality of slave devices and a master device do not use the same communication protocol, parallel communication may be performed.

According to the above embodiments, a parallel communication is provided by connecting a master device and a plurality of slave devices having no prefix number assigning function via a communication network. Additionally, according to the above embodiments, even if a communication protocol used in a plurality of salve devices is different from that in the master device, normal parallel communication may be effectively performed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A parallel communication device comprising:
a first receiving terminal configured to receive communication data transmitted by a master device;
a first transmitting terminal configured to transmit the communication data to a first slave device of a plurality of slave devices;
a first switch configured to manage a first communication line disposed between the first transmitting terminal and the first slave device; and
a control unit configured to:
confirm the first slave device based on destination information in the communication data, wherein the destination information comprises prefix information virtually assigned to the first slave device according to a protocol between the master device and the communication device to determine a destination for transmitting the communication data;
delete the destination information from the communication data and cause the first transmitting terminal to transmit the communication data with the destination information deleted when the first slave device is confirmed;
insert transmitter information into response data received from the first slave device, wherein the transmitter information corresponds to the first slave device that transmitted the response data and comprises prefix information virtually assigned to the first slave device according to a protocol between the master device and the communication device to determine a transmitter of the response data; and
cause transmission of the response data with the inserted transmitter information to the master device.

2. The parallel communication device according to claim 1, wherein the control unit is further configured to control a plurality of switches to deactivate a plurality of communication lines disposed between the control unit and the plurality of slave devices except the first communication line.

3. The parallel communication device according to claim 1, wherein the control unit is further configured to:

confirm a communication protocol used in the first slave device;

convert the received communication data according to the confirmed communication protocol, and cause the first transmitting terminal to transmit the converted communication data to the first slave device.

4. The parallel communication device according to claim 1, further comprising:

a second receiving terminal configured to receive the response data transmitted by the first slave device; and a second transmitting terminal configured to transmit the response data to the master device.

5. The parallel communication device according to claim 4, wherein the control unit is further configured to maintain an activated state of the first communication line until the response data is received from the first slave device.

6. The parallel communication device according to claim 4, wherein the control unit is further configured to:

confirm a communication protocol used in the master device;

covert the received response data according to the communication protocol , and cause the second transmitting terminal to transmit the converted response data to the master device.

7. A parallel communication method comprising:

receiving communication data transmitted by a master device;

confirming a first slave device of a plurality of slave devices to which the communication data is to be transmitted based on destination information in the communication data, wherein the destination information comprises prefix information virtually assigned to a slave device according to a protocol between the master device and a communication device to determine a destination for transmitting the communication data;

deleting the destination information from the communication data when the first slave device is confirmed;

activating a first communication line connected to the first slave device when the first slave device is confirmed;

transmitting the communication data with the destination information deleted to the first slave device through the activated first communication line;

receiving response data from the first slave device;

inserting transmitter information into the response data, wherein the transmitter information corresponds to the first slave device that transmitted the response data and comprises prefix information virtually assigned to the first slave device according to a protocol between the master device and the communication device to determine a transmitter of the response data; and transmitting the response data with the inserted transmitter information to the master device.

8. The parallel communication method according to claim 7, further comprising deactivating a plurality of communication lines connected to the plurality of slave devices except the activated first communication line.

9. The parallel communication method according to claim 7, further comprising:

confirming a communication protocol used in the first slave device;

converting the received communication data according to the confirmed communication protocol; and transmitting the converted communication data to the first slave device.

10. The parallel communication method according to claim 7, further comprising maintaining an activated state of the first communication line until the response data is received.

11. The parallel communication method according to claim 7, further comprising:

confirming a communication protocol used in the master device; and converting the received response data according to the communication protocol before transmitting the response data to the master device.

* * * * *